United States Patent [19]

Bowen et al.

[11] 4,158,760
[45] Jun. 19, 1979

[54] SEED HEATING MICROWAVE APPLIANCE

[75] Inventors: Robert F. Bowen, Burlington; George Freedman; Wesley W. Teich, both of Wayland; Thomas J. Martel, North Reading; E. Eugene Eves, II, Nabnasset, all of Mass.

[73] Assignee: Raytheon Company, Lexington, Mass.

[21] Appl. No.: 865,824

[22] Filed: Dec. 30, 1977

[51] Int. Cl.² ............................................. H05B 9/06
[52] U.S. Cl. ............................ 219/10.55 E; 99/323.5; 219/432; 426/243
[58] Field of Search ................ 219/10.55 E, 10.55 R, 219/10.55 F, 432; 99/323.4, 323.5, 323.8, 345, 347; 426/107, 113, 241, 243, 449

[56] References Cited

U.S. PATENT DOCUMENTS 2,939,379  7/1960  Schmitt ........................... 99/323.8

Primary Examiner—Arthur T. Grimley
Attorney, Agent, or Firm—Harold A. Murphy; Joseph D. Pannone; John T. Meaney

[57] ABSTRACT

An appliance for heating seeds, nuts, grains and the like such as popcorn kernels, for example, by means of microwave radiation, comprising a bowl which is transparent to microwave energy and which has in its lower region an area of restricted size for holding unheated seeds in a clump, the area of the bowl above the restricted area being larger to allow heated seeds to expand, and means for directing the microwave energy upon the clump of seeds.

25 Claims, 9 Drawing Figures

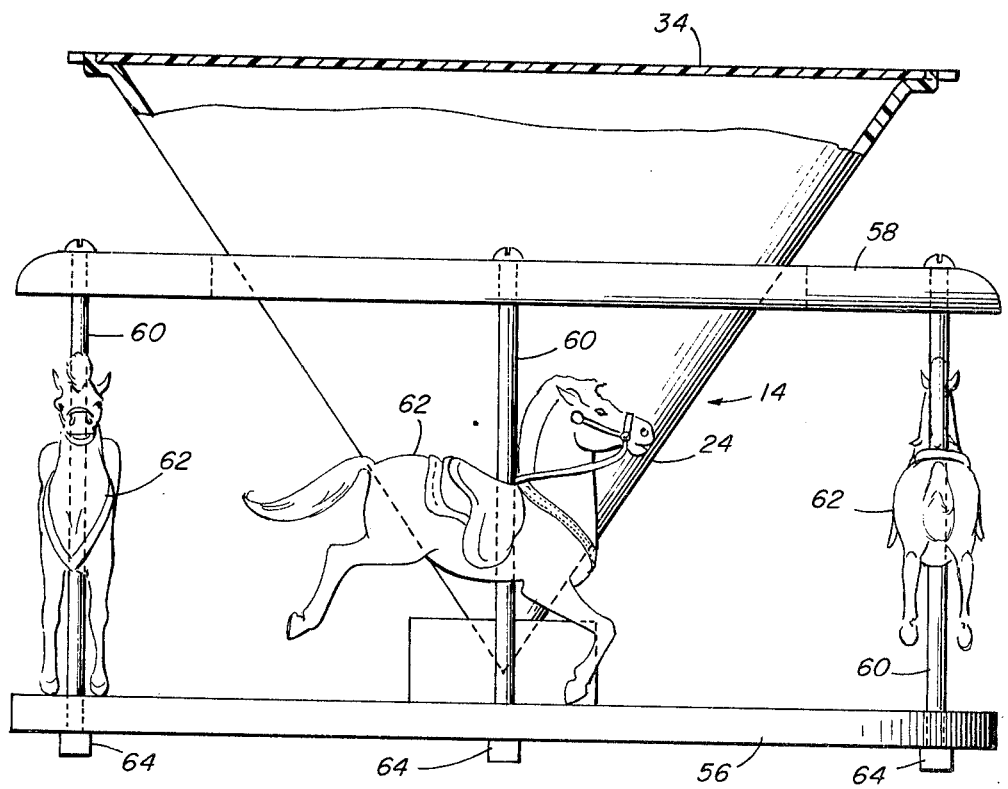
FIG. 7
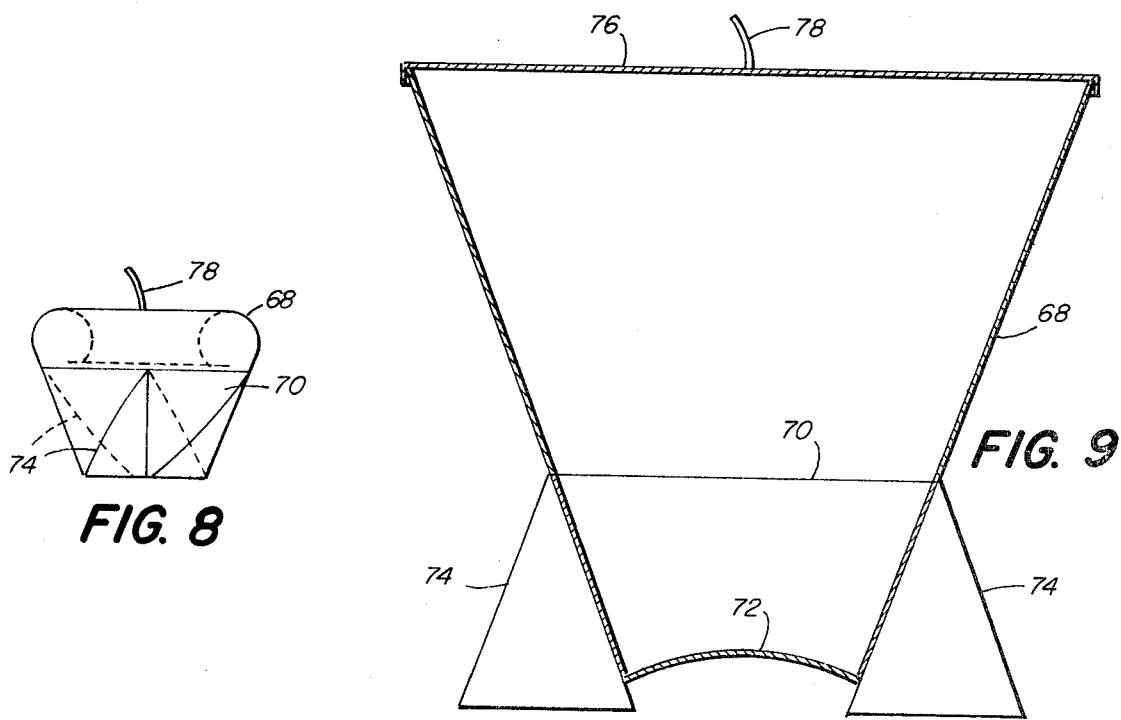
FIG. 8
FIG. 9

SEED HEATING MICROWAVE APPLIANCE

BACKGROUND OF THE INVENTION

This invention relates to the heating of various grains, nuts or seeds by microwave energy and has particular reference to appliances for making popcorn or the like within a microwave oven.

It is commonly known that heat may be applied to grains, nuts or seeds for various purposes. Edible nuts may be roasted, rice grains may be puffed and popcorn kernels may be popped by application of heat either radiatively or convectively in well known conventional ovens fueled by electrical energy, by the burning of liquid or gaseous fuel or by combustion of solid fuel.

Popcorn has been made in many ways. Kernels have been placed in a screenlike container with a long handle so that the container may be held suspended above an open flame. Since the heat from the flame usually radiates onto or contacts only one side of the supply of kernels, it was necessary to vigorously shake the container so that all the kernels would be heated and to prevent burning of the popped corn. Another method was to place a supply of kernels in a covered pan disposed on a burner of a kitchen range, for example, and again shake the pan to properly heat all the kernels and agitate the popped corn. Still another method has been to place the kernels in an enclosure having wall areas containing electrical heating elements. This method again usually requires that the enclosure be at least slightly agitated. In all of these methods, butter and salt must be subsequently added.

It is also known that a partially collapsed sealed foil-like disposable container may be provided with a supply of kernels and oil and agitated over a source of heat whereupon the kernels will pop, causing the container to expand, following which the container may be ruptured to remove the popcorn which will be at least partially covered with the oil. In a still further known method, a partially collapsed, sealed plastic bag of kernels, with or without oil, is placed in a microwave oven. Microwave radiation is then directed through the oven to the kernels, causing them to pop. Agitation in such a case is not necessary since microwave radiation will easily contact each kernel. A suitable oil may also be provided in this type of device.

It has been found that butter can not be used with the packaged systems because butter can become rancid after a period of time such as might occur when the packages are stored or on store shelves for a lengthy period.

SUMMARY OF THE INVENTION

The present invention overcomes the above and other disadvantages of devices of the character described by the provision of a novel appliance which utilizes microwave energy as the heat source. The appliance comprises a bowl-like container of microwave-transparent material and of selected size and shape into which seed-like items such as popcorn kernels may be placed. Upon subjection of the device to microwave energy, as in a microwve oven, the kernels will become heated and will expand or explode, in the case of popcorn kernels.

The bowl is preferably substantially conical in shape with its small end being disposed downwardly so as to form at its lower end an internal region of restricted volume within which the kernels are disposed and retained in a relatively compact clump. The region of the bowl above the area of restricted volume is larger so that when the kernels are puffed or expanded, or exploded as in the making of popcorn, the exploded items will be forced upwardly in the bowl, while unexploded kernels will remain in the bottom thereof.

The bowl may be provided with shapes other than conical, if desired, as long as the unpopped kernels remain constantly together in a clump at the bottom of the bowl and the popped items are allowed to be violently propelled upwardly when heated into an area of larger volume.

The bowl may be suitably supported so that it will be retained in an upright position. Such support means may take any form such as a carrousel, for example, or other attractive arrangement, or may be simply a block of microwave-transparent material into which the bottom of the cone is inserted. The present invention also may be embodied in a disposable package which may be sold in stores or the like.

BRIEF DESCRIPTION OF THE DRAWINGS

The above and other advantages of this invention will become apparent from the following description taken in connection with the accompanying drawings, wherein:

FIG. 7 is an elevational view showing the invention packaged as a carrousel;

FIG. 8 is an isometric view of a disposable popcorn maker in packaged form; and

FIG. 9 is a vertical sectional view of the disposable popcorn maker of FIG. 8 opened for use.

DESCRIPTION OF THE PREFERRED EMBODIMENTS

Figure 1:
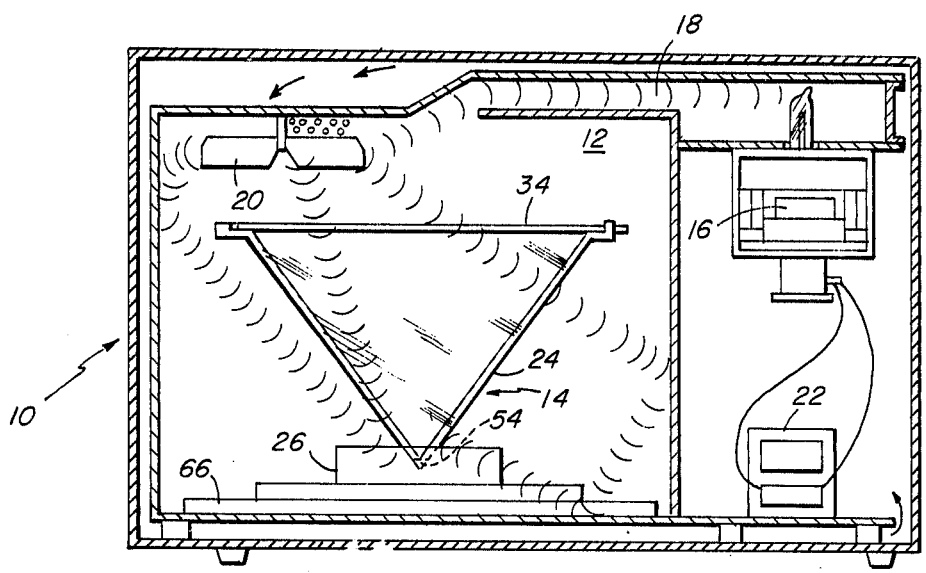
FIG. 1 is a vertical sectional view of a microwave oven showing a popcorn maker embodying the invention located within the oven cavity.

Referring more particularly to the drawings wherein like characters of reference designate like parts throughout the several views, there is shown in FIG. 1 a microwave oven 10 including an oven cavity 12 having a popcorn maker 14 which may be positioned therein through a door (not shown). The oven cavity is supplied with microwave energy from a magnetron 16 via a waveguide 18. While the magnetron 16 may generate energy of any desired frequency, a frequency of about 2.45 KMH is particularly suitable. The oven cavity 12 has internal dimensions which are many times the free space wavelength of said frequency so that many different resonant modes may be produced therein and such modes may be cyclically distributed by a mode stirrer 20.

The cathode of magnetron 16 is supplied with filament heater power and anode voltage power at a voltage of, for example, 4000 volts from a high voltage power supply 22 by suitable wiring while the anode of the magnetron 16 is grounded.

It is believed that this provides sufficient description of the microwave oven 10 and for more information reference may be made to many existing patents or to copending application Ser. No. 671,469, filed 3-26-76 by McConnell et al and assigned to Amana Refrigeration, Inc.

It is to be understood that the present invention is concerned with appliances which may be used for the heating of various types of seeds, nuts, grains or the like by microwave energy. However, the invention is primarily concerned with popcorn makers of novel design and construction which produce relatively large fluffy popcorn by the heating of kernels with microwave energy such as may be supplied by a conventional household microwave oven or other source of microwave energy.

Figure 2:
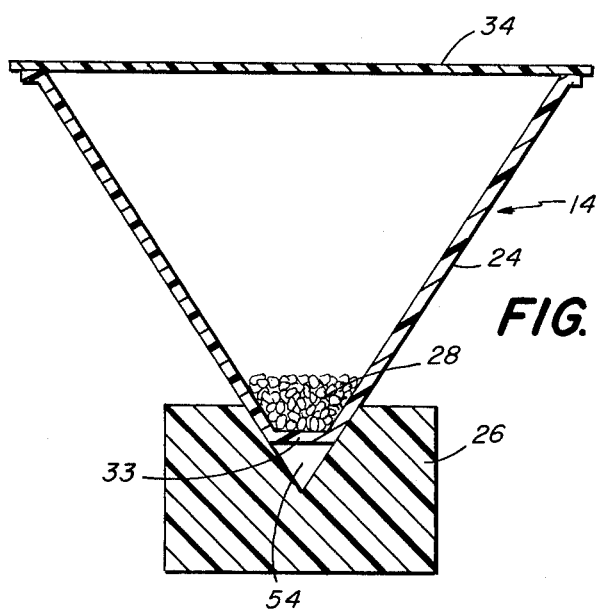
FIG. 2 is a vertical sectional view through a preferred bow and support therefor.

Referring more particularly to FIG. 2, the basic popcorn maker includes a bowl or container 24 which is of a selected shape having a lower region of small internal volume and an upper region of larger internal volume. Such a shape is particularly well exemplified in the conical configuration shown in FIG. 2 wherein the apex of the cone is located at the bottom and the larger end is at the top. Such a conical bowl 24 may be supported by a block 26 of suitable material having a conical depression in its upper surface in which the small end of the bowl 24 is positioned.

In a bowl 24 of the desired shape, the unpopped kernels 28 will necessarily form a closely compacted clump in the bottom of the bowl. When the microwave oven is operated in the normal manner, the microwave energy will enter the oven cavity 12 and will be directed throughout the cavity by multiple reflections off the walls of the oven. Such energy will pass through the walls of the bowl 24 and the microwave transparent support block 26 and will cause heating of the kernels, causing them to explode as is well known in the art of making popcorn.

The bowl 24 and supporting block 26 will be made of a material which is transparent to the microwave radiation. Glass is particularly well suited for the invention as are several plastic materials such as styrene, polycarbonate, and polymethylmethacrylate, for example. Ceramic materials may also be used if desired. It is important, however, that the bowl and block have a low dielectric loss at microwave frequencies, thus making it readily transparent to microwaves. However, these elements particularly the support block 26, may be provided with a slight controlled amount of lossiness if desired, and this may be done by including small amounts of metal or carbon particles. Such lossinss should not, however, interfere with the efficient transmission of microwaves through the material. It is particularly desired that the bowl remain cool enough to handle after subjection to microwave energy.

Figure 3:
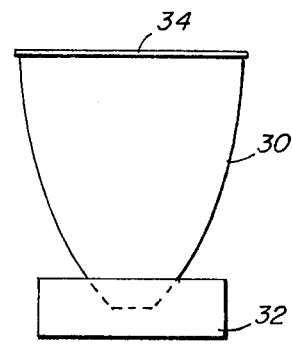
FIG. 3 is an elevational view of a second bowl configuration with support therefor.
Figure 4:
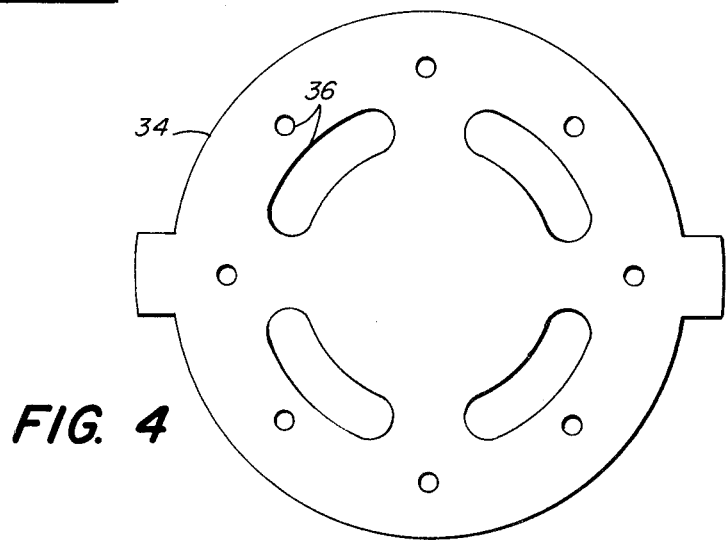
FIG. 4 is a plan view of a bowl lid.

The bowl 24 will preferably be conical in shape as shown in FIG. 2 with its side walls being angled at approximately 70°. However, the bowl 30 may be shaped other than conical as shown in FIG. 3 wherein it has a relatively small concave lower end portion which merges into side walls which extend upwardly and outwardly to form an upper portion of larger volume than the small end portion. The block 32 is provided with a recess in its upper surface which preferably conforms to the shape of the lower end portion of the bowl 30. In both bowls 24 and 30 the extreme lower end is slightly flattened, as shown at 33 in FIG. 2.

A lid 34 is located on the open top of the bowl to prevent undesired escape of popcorn during a popping process. However, it is desirable that steam which is created by the heating of the kernels be allowed to escape. Therefore, the lid 34 is provided with perforations 36 which may be arranged in any desired pattern.

All parts of the device including the lid 34 are made of microwave-transparent material such as the bowl 24 so that microwaves may easily find their way to the clump of kernels 28.

It has been found that microwaves entering the cavity 12 progress directly or by reflection to the clump 28 and cause the kernels in the clump to be heated without causing any substantial heating of the parts of the device. Such heating of the kernels or grains will cause them to expand, puff or, in the case of popcorn, to explode. Such explosion will cause the exploding kernels to move violently upward in the bowl 24. It is believed that kernels near or on the small flat bottom 33 or lying against the inclined walls of the cone may explode before other kernels within the clump. However, in any case, the explosion and resultant violent movement of a kernel will cause a disruption of the kernels within the clump. The popped kernel will fly upwardly causing some unpopped kernels to also be moved up in the bowl. However, such unpopped kernels will fall back down into the clump because of the steep inclination of the walls and because of their relatively small size. Popped kernels will, because of their relative size, stay above the clump.

Figure 5:
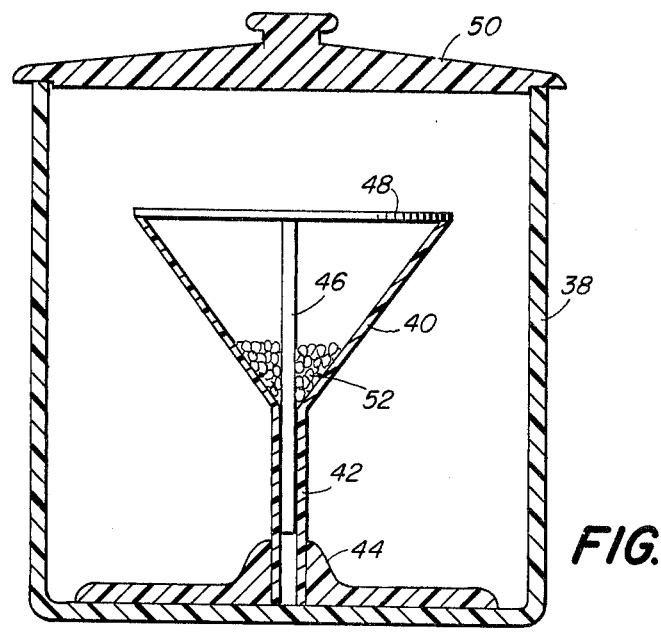
FIG. 5 is a vertical sectional view of a device embodying the invention shown holding unheated kernels.
Figure 6:
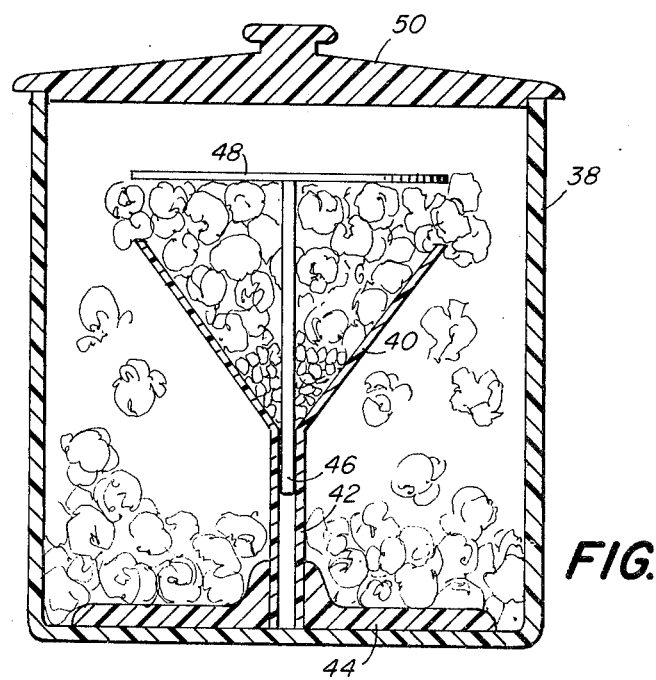
FIG. 6 is a similar view of the device of FIG. 5 showing the invention when kernels are being heated.

In FIGS. 5 and 6 there is shown a popcorn maker which is enclosed within a chamber 38 of microwave transparent material. The popcorn maker includes a substantially conical bowl 40 having a tube 42 extending downwardly from its small lower end to a pedestal or base 44 which supports it upon the bottom of the chamber 38. A stem 46 is located within the tube 42 and is connected at its upper end to the under side of an apertured lid 48 which closes the top of the bowl 40. The stem 46 is axially vertically movable in the tube 42 and the distance between these two parts is small enough to prevent kernels from lodging therebetween. A suitable microwave-transparent cover 50 may be located on the top of the chamber 38 if desired.

Popcorn kernels 52 are placed in the bowl 40 by slightly raising the lid 48 and thereafter allowing the lid to be lowered onto the upper end of the bowl. The chamber 38 containing the popper is then placed in a microwave oven. All of the parts of the apparatus are readily transparent to microwave energy and, therefore, microwaves generated by the oven will contact the clump 52 of kernels in the lower end of the bowl 40. When the kernels 52 pop or explode they will fill up the bowl 40 and will eventually cause the lid to be raised. Popcorn will then fall out the top of the bowl 40 to the bottom of the chamber 38, as shown in FIG. 6.

It is to be understood that all of the parts of the device shown in FIGS. 5 and 6 are substantially entirely non-metallic and are transparent to microwave energy.

Referring now to FIG. 7, there is shown a novel and attractive packaging arrangement for the device 41 embodying the invention. The device 24 comprising the bowl 24 with lid 34 is positioned in the cavity 54 in a support block 26 which is suitably affixed to a base plate or disc 56. Encircling the bowl 24 well above the base 56 is an annular canopy 58 which is supported on the base plate 56 by a number of posts 60. Each post 60 supports a replica 62 of an animal such as a horse, for example. The upper ends of the posts are bolted or otherwise secured to the canopy 58 and the lower ends are preferably provided with reduced diameter end portions which extend through the base plate into small leg members 64 by which the entire appliance is supported upon the bottom wall of the oven cavity 12 or upon a glass plate located on the bottom wall as shown at 66 in FIG. 1.

It is again to be understood that substantially the entire appliance is easily transparent to microwave energy so that the energy may readily contact seeds or kernels in the clump at the bottom of the bowl 24.

The present invention can be readily applied to disposable packaging as shown in FIGS. 8 and 9. Referring to FIG. 8, a frusto-conical bowl 68 of collapsible material such as paper or thin plastic is secured at its lower end to a cup-shaped portion 70 of more rigid material such as card stock or plastic. The lower and smaller end of the cupped portion 70 is provided with a concave paper, plastic or thin metal end cap 72. Winglike portions 74 extending from the sides of the cupped portion 70 serve to support the device in position of use by their lower ends. A suitable closure cup or lid 76 is sealed to and closes the upper end of the bowl 68.

In collapsed form the device shown in FIG. 9 appears as seen in FIG. 8 wherein the rigid portion 70 has on its upper side the bowl 68 which with closure 76, is rolled or folded downwardly thereon to close the upper end of the rigid portion. The rigid portion 70 is filled with popcorn kernels. This provides a neat small package which may be readily stored.

When such a package as shown in FIG. 8 is to be used, the bowl portion 68 is unrolled or unfolded by merely pulling on a string or tab 78 whereupon the device will assume the shape shown in FIG. 9. The wings or legs 74 may be bent outwardly and the device then placed in the microwave oven in the upright position shown. Since the kernels will be clumped together in the rigid portion 70, and since all of the parts of the device are readily transparent to microwave energy, the kernels will be efficiently heated and popped to make conventional popcorn. When the popping process is completed the closure member 76 may be easily ruptured to allow the popcorn to be removed, after which the device may be discarded.

It is to be understood that the disposable device may take other packaged forms as long as the final product as used comprises a bowl having a small volume lower end portion and an upper portion of larger volume.

From the foregoing it will be apparent that all of the objectives of this invention have been achieved in the microwave appliance shown and described. All parts of the device are made of material having low dielectric loss at microwave frequencies and are, therefore, microwave transparent and include substantially no metal or carbons which would become heated when subjected to microwave radiation. The presently described appliance is, as pointed out, adaptable to various modifications and embodiments which may have different dimensional or thermal variations.

However, it is to be understood that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. Apparatus for heating kernels, seeds, nuts, grains and like items comprising a microwave cavity, means for directing microwave energy into said cavity, an appliance removably positioned in said cavity within the field of radiation from said means and comprising a conical bowl closed at its smaller end and having a lower region of restricted internal volume with means for retaining said items in a massed clump and an upper region of a volume greater than the volume of said lower region, said bowl being transparent to microwaves.

2. Apparatus as set forth in claim 1 wherein said lower region of the bowl has an external shape of predetermined configuration, and a support for the bowl is located beneath said lower region and has a cavity in its upper side shaped to receive said lower region, said support being transparent to microwaves.

3. Apparatus as set forth in claim 2 wherein the apex portion of the bowl comprises said lower region, and the cavity in said support is conical in shape to interfit with said lower region.

4. Apparatus as set forth in claim 2 wherein an apertured lid is removably positioned in closing relation to said upper region of the bowl, said lid being transparent to microwaves.

5. Apparatus as set forth in claim 1 wherein said conical bowl has side walls extending vertically at an angle of about 70°.

6. Apparatus for heating kernels, seeds, nuts, grain and like items by microwave energy comprising a microwave cavity, means for directing microwave energy into said cavity, a container removably positioned in said cavity within the field of radiation from said means and formed of material transparent to microwave energy, said container having restraining means at one end for retaining said items in a massed clump and having a region above the restraining means which is larger in internal volume than the volume occupied by the clump.

7. Apparatus as set forth in claim 6 wherein the side walls of said region are inclined to cause items in the clump which are removed into said region during a heating cycle to return to the clump by gravitation.

8. Apparatus as set forth in claim 7 wherein a support of microwave-transparent material is located beneath said container and has a portion enclosing said means for retaining the items in a clump.

9. Apparatus as set forth in claim 8 wherein said means comprises a portion of the container, and restraining said support has a recess in its upper side which receives and encloses said portion of the container.

10. Apparatus as set forth in claim 8 wherein said container is substantially conical with the apex portion of the bowl being closed and comprising said restraining means, and the support has a conical recess in its upper side which interfits with said apex portion of the container.

11. Microwave corn popping apparatus comprising a microwave oven, means for directing microwave energy into said oven, a bowl of microwave-transparent material removably positioned in said oven, said bowl having a lower region of restricted internal volume for holding kernels to be popped, and further having an upper region of larger internal volume located above said lower region, and a support beneath said bowl, said support being transparent to microwaves and having means interfitting with said lower region of the bowl for supporting the bowl in an upright position.

12. A microwave corn popper as set forth in claim 11, wherein said bowl is substantially conical in shape and closed at its smaller end.

13. A microwave corn popper as set forth in claim 12 wherein said support has a conical recess in its upper side which interfits with the lower end of the conical bowl.

14. A microwave corn popping apparatus comprising a microwave oven, means for directing microwave energy into said oven, a chamber removably located in said oven, a bowl within said chamber, said bowl being substantially conical in shape and having a tube extending downwardly from its lower end, a base supporting the tube, a lid covering the upper end of the bowl, and a stem projecting downwardly from the lid into said tube and vertically movable therein, said chamber, bowl, tube and stem being of microwave-transparent material.

15. A microwave corn popping apparatus comprising a microwave oven, a bowl removably located in said oven and having at its lower end a region of restricted internal volume and having a region of larger internal volume above lower region, a block supporting the bowl at its lower end, a base carrying said block and bowl, an annular canopy encircling said bowl in spaced relation to said base, posts carried by said base and supporting the canopy at the upper ends, and replicas carried by said posts, said bowl, block, base, canopy, posts and replicas being of microwave-transparent material.

16. A microwave oven having a disposable microwave corn popper therein, said popper comprising a substantially conical container having a flexible large upper portion and a smaller relatively rigid lower portion, outwardly flared flexible members carried by said lower portion, and a rupturable closure at the upper end of the container, said container and lid being of microwave-transparent material.

17. A microwave corn popping apparatus comprising a microwave oven, means for directing microwave energy into said oven, a bowl of microwave transparent material removably located in the oven and having constraining means at the lower end thereof for retaining unpopped kernels in a massed clump, said bowl having a lower region of restricted internal volume and an upper region of volume greater than that of said lower region for collection of popped corn, said bowl further having side walls inclined upwardly and outwardly for permitting kernels disturbed during a popping cycle to return to said restraining means by gravity.

18. A microwave corn popping apparatus as set forth in claim 17 wherein said bowl is conical and said restraining means comprises the apex portion of the bowl.

19. A microwave corn popping apparatus as set forth in claim 17 wherein a support for the bowl is located beneath said lower region and has a cavity in its upper side shaped to receive said lower region.

20. A microwave corn popper as set forth in claim 17 wherein said side walls of the bowl extend upwardly at an angle of about 70°.

21. A popcorn making appliance comprising a microwave oven, means for directing microwave energy into said oven, a bowl removably located in said oven and having constraining means at the lower end thereof for retaining unpopped kernels in a massed clump, said bowl having a lower region of restricted internal volume and an upper region of volume greater than that of said lower region, said bowl further having side walls inclined upwardly and outwardly for permitting kernels disturbed during a popping cycle to return to said restraining means by gravity.

22. A popcorn making appliance comprising a microwave oven, a container removably positioned in said oven and having a first region of a predetermined volume, a second region of lesser volume than said first region, and a restrainer at one end of said second region, said restrainer being cuplike in configuration and of a size such that popcorn kernels are held therein in a clump, and said second region having inclined walls whereby unpopped kernels disturbed from the clump and falling on the inclined walls will be directed back into the clump.

23. An appliance as set forth in claim 22 wherein said container, restrainer and walls are of microwave transparent material.

24. A method of making popcorn comprising disposing a supply of unpoped popcorn kernels in a container which has retraining means for retaining said kernels in a clump and has inclined walls with one end associated with said restraining means, subjecting said clump to microwave energy for a period of time to cause some of said kernels to abruptly explode and consequently remove themselves from the restraining means and simultaneously causing some of the unexploded kernels to move out of the restraining means, onto an inclined wall and thence back into said restraining means, and continuing the application of microwave energy until at least a major portion of the kernels have exploded and removed themselves from the restaining means.

25. A method of making popcorn comprising the steps of retaining a supply of unpopped popcorn kernels in a massed clump, subjecting said clump to microwave energy for a period of time sufficient to cause some of said kernels to explode with consequent removal from the clump and simultaneous disturbance of unexploded kernels in the clump, and continuing the application of the microwave energy to the clump while the disturbed unexploded kernels move back into said clump and until at least a major portion of the kernels have exploded and removed themselves from the clump.

* * * * *